United States Patent [19]
Burch et al.

[11] Patent Number: 5,554,069
[45] Date of Patent: Sep. 10, 1996

[54] APPARATUS AND METHOD FOR SUBDIVIDING A FISH INTO A LOIN-CONTAINING PORTION AND A VISCERA-CONTAINING PORTION

[75] Inventors: Ronald H. Burch; Andrew A. Corley, both of Harahan; Eric W. Morales, New Orleans; Kirk T. Selenberg, Metairie, all of La.

[73] Assignee: The Laitram Corporation, Harahan, La.

[21] Appl. No.: 456,493

[22] Filed: Jun. 1, 1995

[51] Int. Cl.[6] .................................................. A22C 25/18
[52] U.S. Cl. ........................................... 452/149; 452/162
[58] Field of Search .................................. 452/149, 107, 452/108, 161, 162

[56] References Cited

U.S. PATENT DOCUMENTS

| | | | |
|---|---|---|---|
| 2,479,010 | 8/1949 | Jones | 452/108 |
| 3,082,094 | 3/1963 | Kramer | 99/111 |
| 3,319,284 | 5/1967 | Schlichting | 452/170 |
| 3,675,273 | 7/1972 | Vidjak | 17/61 |
| 3,919,741 | 11/1975 | Backhaus et al. | 452/170 |
| 4,442,569 | 4/1984 | Brower et al. | 452/107 |
| 5,026,318 | 6/1991 | Jahnke | 452/116 |
| 5,135,432 | 8/1992 | Kristinsson | 452/160 |
| 5,167,570 | 12/1992 | Ryan | 452/160 |
| 5,299,974 | 4/1994 | Jahnke | 452/106 |

FOREIGN PATENT DOCUMENTS

| | | | |
|---|---|---|---|
| 269999 | 7/1989 | Germany | 452/108 |
| 889787 | 2/1962 | United Kingdom . | |

*Primary Examiner*—Willis Little
*Attorney, Agent, or Firm*—James T. Cronvich

[57] ABSTRACT

Apparatus and method for subdividing a fish body into a loin-containing portion and a viscera-containing portion. The apparatus includes a carrier, a cutting assembly, and a runway connecting the two. The cutting assembly and a fish body supported on the carrier are advanced relative to each other along the runway. Blades at the cutting assembly flank the runway and form a pair of angled cuts intersecting to form a V-cut that opens toward the ventral side of the fish body. The planes of the blades are separated by an angle of between 80° and 160°, depending on fish species and size, to minimize the amount of loin meat separated with the viscera. Means are provided for setting the tilt of the longitudinal axis of the fish body relative to the path of the vertex of the V-cut so that the path extends between the backbone of the fish and its visceral cavity substantially from the vent to a point on the outside surface of the fish body in the vicinity of the eyes. In this way, a wedge-shaped belly section containing the viscera and belly bones is cut from the remaining loin-containing sections of the fish body. The two sections are thereby made available for downstream processing at separate stations.

33 Claims, 8 Drawing Sheets

APPARATUS AND METHOD FOR SUBDIVIDING A FISH INTO A LOIN-CONTAINING PORTION AND A VISCERA-CONTAINING PORTION

BACKGROUND

The invention relates to the butchering of fish and, more particularly, to apparatus and methods for subdividing a fish body into a loin-containing portion and a viscera-containing portion.

In the processing of fish, such as tuna, meat to be processed for human consumption must be separated from undelectable or otherwise inedible portions prior to canning. Among the inedible portions are the viscera, which reside in the visceral cavity extending on the ventral side of the fish from the head to the vent, or anus. It has previously been recognized that the viscera could be largely removed by cutting crosswise through the fish along a straight line running roughly from the vent through the eyes. Such a cut would separate the fish into a first section containing the loin meat and a second head and belly section containing some belly wall meat and the bulk of the viscera, regardless of the size of the fish.

An apparatus for producing such a cut is disclosed in U.S. Pat. No. 3,675,273, issued Jul. 11, 1972, to Frank V. Vidjak. The tuna butchering apparatus described includes a power-driven vertically movable knife urged toward and away from a table upon which a fish is positioned. The fish, lying on its side on the table, is oriented so that the single knife blade cuts downwardly through the fish from one side to the other along a straight line extending approximately from the center of the eye to the vent.

With the Vidjak apparatus, however, there is a tradeoff between the amount of visceral material cut and the amount of intact loin meat left with the loin-containing portion of the fish. The single planar cutting path across the width of the fish is not compatible with the curved cross-sectional pattern of the visceral cavity. Consequently, either too much meat is removed with the viscera or too much of the viscera remains with the loin-containing fish portion. Furthermore, organs such as the kidney and hemal spine, which reside deeper inside the fish close to the backbone, are difficult to remove without cutting through edible loin meat. With thicker lower loin meat left attached to the thin belly wall meat, uniform cooking of the meat from the separated section is difficult. Thus, to ensure that the thicker sections are adequately cooked, the thin belly wall meat will be overcooked and quality decreased.

Other shortcomings with prior art cutters arise from the blades used. Saws, for example, waste meat along the cut as kerf. The chopping blade of the Vadjak apparatus cuts straight in the nature of a shear without reciprocation or other motion normal to blade advancement. Thus, any dull spots, chips, or other imperfections in the blade affect the quality of the cut.

The apparatus, moreover, requires an impulse of force to cut through the fish, especially if the fish is frozen. Because the rounded side of the fish is lying on a flat table, the force of the blade on the other side of a frozen fish may tend to cause the fish body to shift upon impact of the blade. If the fish moves, the cut will deviate from the desired cutting path.

A key concern in tuna canning is that the canned product be free of bones. Tuna fish have many small flat and round bones that extend along each side of the upper belly wall behind the head of the fish. It is preferable that these bones be separated from the loin portion of the fish. As a consequence, any cut made in the fish must avoid cutting through these bones.

Another fish preparation apparatus is described in U.S. Pat. No. 5,299,974, issued Apr. 5, 1994, to Joachim Jahnke. The apparatus produces a double fillet fish product that includes the head and tail. The apparatus performs a two-step cutting process on an unfrozen fish conveyed backward in a swimming position through two sequential cutting tools. A first cutting tool, comprising a pair of parallel, closely spaced knives having clean-out elements attached to the outer sides of the blades, makes incisions in the ventral side of the fish through which the loose viscera are scraped out by the clean-out elements. A second downstream cutting tool is arranged to cut thin, rib-containing portions from the fish. The end product is a generally whole and boneless butter-flied fish.

Current trends in the canning of tuna suggest that automated processing will replace at least some formerly and currently manual tasks. To be useful in the long term, a new tuna processing apparatus should be fully automated or readily adaptable to incorporation in an automated process.

For the foregoing reasons, there is a need for an apparatus for subdividing a fish, especially a tuna, into two sections—a first section containing virtually all of the loin meat and a second section containing thin belly wall meat, the viscera, the belly bones, and other generally inedible matter. The apparatus must be capable of holding a fish steady in a controlled orientation to make accurate incisions in the fish body to minimize the amount of thick lower loin meat accompanying the viscera separated from the remaining fish body. The apparatus must avoid cutting through the belly bones, tolerate dull spots or other blade imperfections, and be readily adapted for use in an automated process.

SUMMARY

These needs are satisfied by the present invention. An apparatus for subdividing fish and having features of the invention comprises a cutting assembly, a carrier supporting a fish, and a runway connecting the cutting assembly and the carrier. A fish supported on the carrier and the cutting assembly are advanced relative to each other along the runway. For example, in one version, the cutting assembly is stationary at an end of the runway and the carrier is advanced along the runway to the cutting assembly. In another version, the carrier is stationary as the cutting assembly advances along the length of the fish. The carrier supports the fish generally lengthwise along the runway. The cutting assembly has means, such as blades, for producing a pair of joined, facing cuts into an object advanced through it along a cutting direction. As the fish advances relative to the cutting assembly, the angle between the cutting direction of the cutting assembly and the longitudinal axis of the fish is set to a preferred cutting angle by, for example, tiring the portion of the carrier supporting the fish. As the tilted fish advances relative to the cutting assembly along the cutting direction, the cutting assembly produces cuts joined along a path extending between the backbone of the fish and its visceral cavity substantially from the vent to a point on the outside of the fish in the vicinity of the eyes. In this way, a wedge-shaped belly section containing the viscera, as well as the belly bones, is cut from the fish. The belly section and the remaining eviscerated fish portion are thus readied for further separate processing.

In a version of the apparatus in which the fish is tilted on a movable carrier, the carrier has a base portion and a support portion attached to the base portion by a pivot pin near the forward end of the carrier. Means for setting the angle between the cutting direction and the longitudinal axis of the fish tilt the support portion supporting the fish relative to the base portion and the runway as the fish is advanced along the runway. In this way, the support portion is oriented at one end of the runway at an angle convenient for loading the fish into the carrier and at another angle—the preferred cutting angle—as the fish engages the cutting assembly at the other end of the runway. In conjunction with easy loading of the fish into the carrier, one version has an automatic alignment feature for aligning the fish in the carrier along the runway.

To support the fish on the carrier, another version of the carrier includes a longitudinal stop plate supporting the back of the fish. The stop plate is flanked by a pair of rails that have opposing surfaces angled outwardly of the stop plate to form a truncated V-shaped channel with the stop plate. The rails are laterally slidable to adjust the width of the channel to accommodate fish of various sizes. The rails provide lateral support to the fish in the carrier. The fish is secured by a head retainer that restrains the head of the fish at the end of the carrier farther from the cutting assembly. In this version, the fish engages the cutting assembly tail end first.

In various versions of the apparatus, the carrier rides along the runway. In one such version, the carrier includes a set of wheels that rolls along a track parallel to and flanking the runway. The track has a horizontal portion and a sloping portion sloping downward from an end of the horizontal portion farther from the cutting assembly. As the wheels roll along the sloped portion of the track, the carrier tilts from a horizontal position for loading the fish to a tilted position for presenting the fish to the cutter at a preferred cutting angle. In another version, the carrier is advanced by means of an air cylinder coupled to the carrier and providing a constant force of advancement through the cutting assembly.

One version of the cutting assembly having features of the invention includes a first blade on one side of the path along which the fish is transported and a second blade on the opposite side. Each blade is disposed to cut an incision in the ventral side of a fish transported along the path. The blades are disposed so that each cut extends from an opposite side of the fish to a central line extending substantially from the vent to a point on the outside of the fish near the eyes. Such a cut removes a belly section containing the viscera from the fish. In another preferred version of the cutting assembly, the planes of the blades are positioned to intersect each other at an angle of less than 180°, and more preferably in the range of 80° to 160° to form a V-shaped cut that minimizes the amount of loin meat cut from the fish in the removal of the viscera, belly meat, and belly bones. Other versions of the cutting assembly include blades tangent to each other and positioned as mirror images of each other symmetrically flanking the transport path or circular blades rotated by motors, for instance, at a circumferential rate approximately equal to the speed of transport of the fish along the path. With the blade speed roughly matched to the transport speed, the force required to urge the fish through the cutter is lessened because the blade tends to pull the fish through as it cuts.

In another version of the apparatus, the cutting assembly uses ultrasonically reciprocated blades to cut the fish. In this ultrasonic version, the blades are advanced radially into the fish along the plane of the cuts.

A method of subdividing fish into two sections incorporating features of the invention includes the step of cutting a fish with a pair of cuts flanking and forming acute angles with a central vertical plane through the fish. The cuts meet along a path extending on the back, or dorsal, side of the visceral cavity substantially from the vent to a point on the outside surface of the fish in the vicinity of the eyes and opening toward the ventral side of the fish. In another method, the cuts angle outward from their intersection to form a V that opens toward the ventral side of the fish. In all versions of the method, belly sections encasing the viscera are removed from the remainder of the fish body, which includes loin sections largely left intact.

DRAWINGS

These and other features, aspects, and advantages of the invention are better understood by reference to the following description, appended claims, and accompanying drawings in which:

DESCRIPTION

Figure 1:
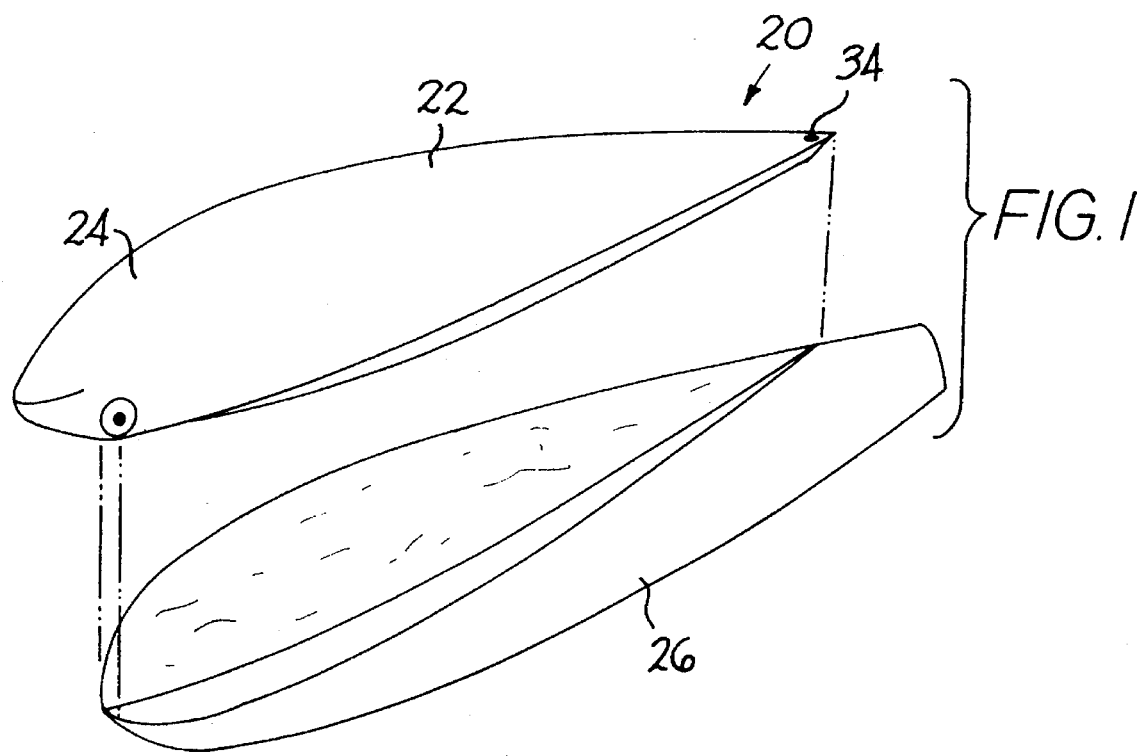
FIG. 1 is an exploded perspective view of a fish body separated into two sections by the apparatus of the invention.

The invention provides an apparatus for subdividing a fish body 20, as shown in FIG. 1, into two sections—a belly section 22 containing part of the head 24 and encompassing substantially all of the viscera and a larger loin-containing section 26 containing most of the edible loin meat. The apparatus, as shown in FIGS. 2–7, comprises a framework 40 mounted on a plurality of legs 42 stabilized by braces 44, 45. The framework 40 supports a cutting assembly 46 along a runway 48. A carrier 50 advances a supported fish body along the runway 48 to the cutting assembly 46 where the fish body is cut.

The runway 48 is formed of a pair of parallel guide rails 52 mounted on the framework 40. The cutting assembly 46 is positioned along the runway 48. The carrier 50 includes a base portion 58 and a support portion 60. Bushings 62 attached to the underside of the base portion 58 ride along the guide rails 52. A slotted bidirectional air cylinder 64 mounted on the framework 40 between and below the guide rails 52 includes a runner 66 coupled to the air cylinder's internal drive mechanism. The runner 66 is attached to the base portion 58 of the carrier 50 by a drive bar 68. Brackets 70 extend upwardly from the base portion 58 to which they are fastened on either side of the carrier 50 near its forward end 72. The brackets 70 are pivotally connected to the support portion 60 by a pivot pin 74 attached to and extending transversely across the support portion. The pivotable connection enables the support portion 60 to tilt with respect to the base portion 58 in the direction given by arrow 76 in FIG. 4.

Figure 4:
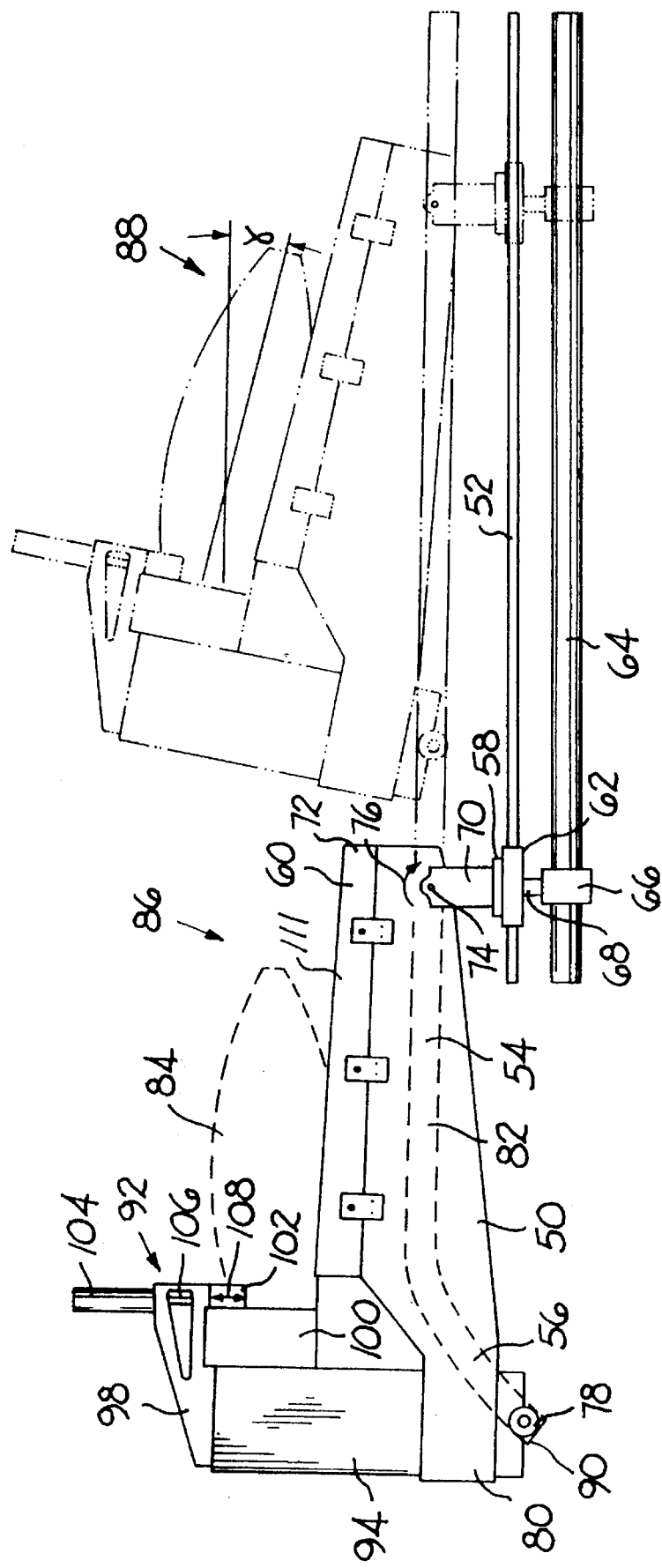
FIG. 4 is a side elevational view of the carrier assembly, the runway, and the wheel tracks of the apparatus of FIG. 2, showing the carrier in a loading position and in an alternate tilted position (in phantom lines)

The carrier 50 further includes a pair of wheels 78 near the rear end 80. The wheels 78 engage a track 82 made up of two parallel track portions supported on the framework 40 and flanking the runway 48. The track 82 has a horizontal portion 54 and a sloping portion 56 sloping downward from the end of the horizontal portion farther from the cutting assembly 46. The wheels 78 are coupled directly to the support portion 60 of the carrier 50 so that, as the carrier is pulled along the runway 48 by the air cylinder 64, the wheels 78 riding along the sloping portion 56 of the track 82 cause the support portion to tilt relative to the base portion 54 about the pivot pin 74. As shown in FIG. 4, the support portion 60 pivots from a generally horizontal position 86 for loading of the fish 84 to a preselected tilt position 88 indicated by the phantom lines. The tilt is achieved by the rise in elevation of the track 82 from the lower end 90 of the sloping portion 56 to the level of the horizontal portion 54. In this way, the tilting is automatically coordinated with the advance of the carrier 50 along the runway 48. The reason for and the amount of tilt is described subsequently. The head of the fish 84 is retained by a head retainer assembly 92 mounted at the rear end of the carrier 50. The retainer assembly includes side walls 94 supporting a horizontal top plate 96. A mounting platform 98 fastened to the top plate 96 extends outward of the top plate and side walls 94. A pair of head wedges 100 extend from the platform—one from each side. The head wedges 100 provide lateral support for the head of the fish 84 abutting a head stop 101.

The head retainer assembly 92 can be rotated to adapt to turned fish heads. A head clamp 102 has a concave longitudinal channel on its bottom side, the channel conforming generally to the contour of the fish 84. An air cylinder 104 attached to the platform 98 extends and retracts a push rod 106 to move the head clamp 102 into and out of securing engagement with the head of the fish 84, as indicated by a two-headed arrow 108. In this way the head of the fish 84 is securely held by the head clamp 102 and the head wedges 100.

Figure 5A:
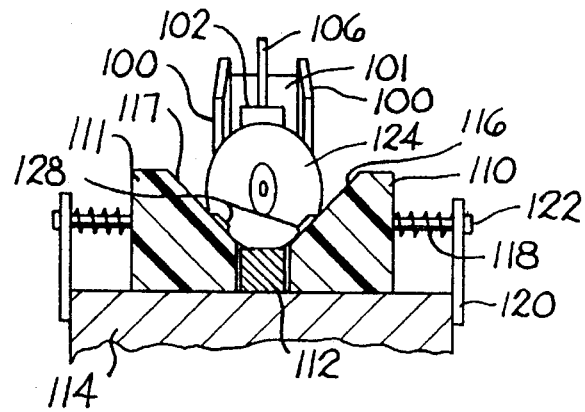
FIG. 5A is a cross-sectional end view of the carrier taken along line 5—5 of FIG. 4 supporting a small fish.
Figure 5B:
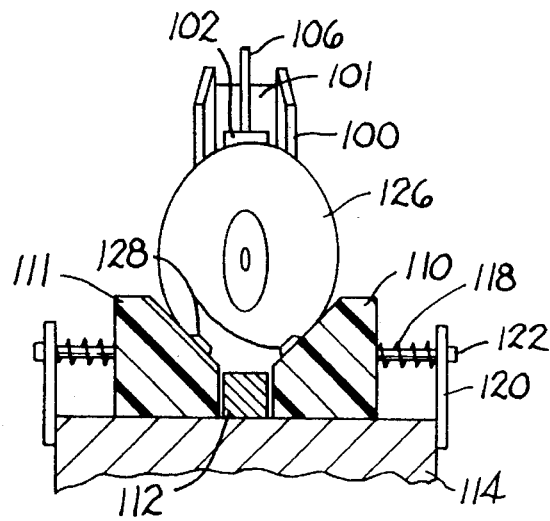
FIG. 5B is a view similar to that of FIG. 5A, except for a larger fish.

The body of the fish 84 is cradled belly up in a truncated V-shaped channel formed on the support portion 60 of the carrier 50 by a pair of parallel rails 110, 111 flanking a central stop plate 112. The stop plate 112 is affixed to the floor 114 of the support portion 60 along the length of the carrier 50 to lend backing to the dorsal ridge of the fish 84. The rails 110, 111 are spring-loaded in sliding engagement with the floor 114 of the support portion 60. Each rail 110, 111 has an oblique inner face 116, 117 angled upward and outward of the stop plate 112 to form the truncated V-shaped channel. The rails 110, 111 are self-adjusting by virtue of their sliding engagement with the floor 114 of the support portion 60. Springs 118 extend from spring supports 120 attached to the side of the support portion 60 through spring retainer pins 122 to urge the rails 110, 111 toward the stop plate 112, thereby providing lateral support adjustable to fish of various sizes as indicated by arrows 130. As shown in FIGS. 5A and 5B, the rails 110, 111, as well as the head clamp 102 and head wedges 100, automatically adjust to small fish 124 and to large fish 126. The head stop 101 and the stop plate 112 serve as alignment bases for the fish body. Tail wedges 128 that slide along the oblique faces 116, 117 of the rails 110, 111 into wedged engagement with the sides of the fish 84 provide further stability.

A gantry 132, having a pair of side walls 134 connected at their tops by a horizontal plate 136, straddles the runway 48 at a position spaced away from the cutting assembly 46. The gantry 132 is affixed to the framework 40 by brackets 138 extending from the corners of the side walls 134 to the sides of the framework. A set of spaced apart vertical rail pairs 140 attached to the inner side of each gantry side wall 134 serves to guide a fish leveling assembly 142 into position to level a fish 84 automatically on the stop plate 112. The leveling assembly 142 includes a tent-shaped leveler 144. The ridge of the leveler 144 and support vanes 146 attached to the oblique outer sides of the leveler are affixed to the underside of a leveler support 148. A pair of bearing surfaces 150 on each side of the support 148 slidably engage the vertical rails 140. An air cylinder 152 having a push rod 154 attached to the topside of the support 148 advances the leveler 144 according to arrow 160 between an up position 156 and a down position 158, shown in phantom, urging the fish into a level position on the carrier 50 with the longitudinal axis of the fish generally parallel to the stop plate 112.

Figure 7:
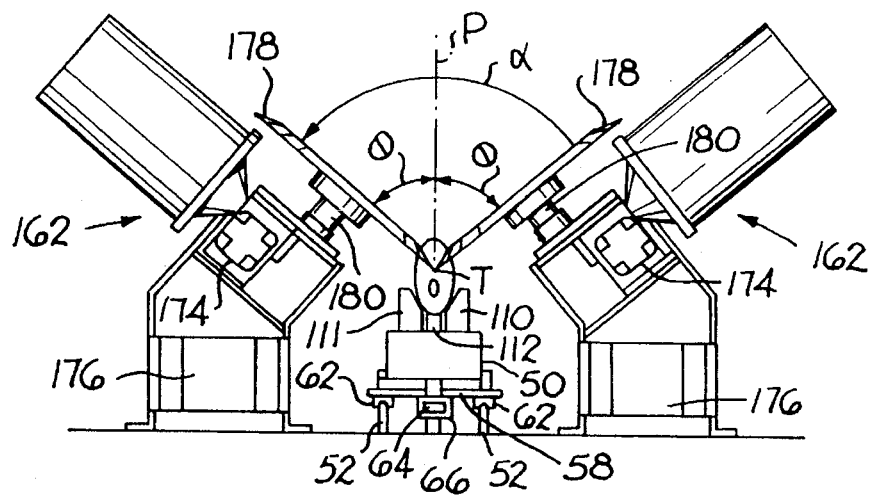
FIG. 7 is an end view of the cutting assembly of FIG. 6, showing a fish body advancing toward it along the runway.
Figure 6:
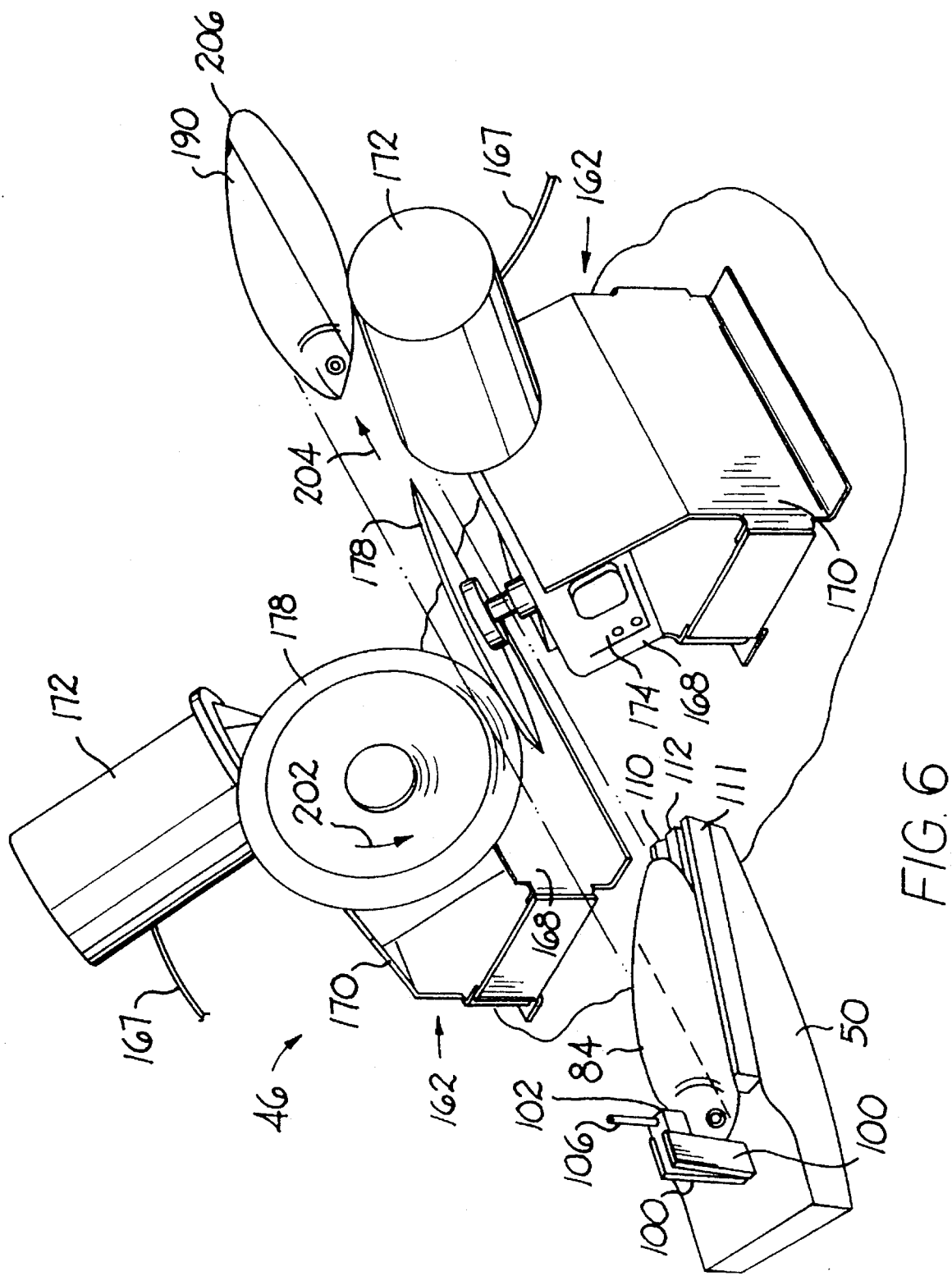
FIG. 6 is a partial perspective view of the cutting assembly of the apparatus of FIG. 2, showing a fish body supported by the carrier prior to cutting and the fish body after cutting.

The cutting assembly 46, shown in more detail in FIGS. 6 and 7, is positioned at an end of the runway 48. The cutting assembly comprises a pair of identical cutters 162 that are mirror images of each other across a vertical plane P bisecting the runway 48. Each cutter 162 is mounted on a support block 164, 165, attached to the side of the framework 40. Motor starter controls, pushbuttons, and indicators 166 are contained in one of the support blocks 164. Each cutter 162 includes an inner mounting bracket 168 and an outer mounting bracket 170. The outer mounting bracket 170 is secured to the outer top surface of the support block 164, 165 and serves as a motor mount for an electric motor 172 controlled by the motor starter 166 through wires 167. The shaft of the motor 172 is coupled to a gear reducer 174 mounted between the outer mounting bracket 170 and the inner mounting bracket 168. The brackets 168, 170 are further connected by side braces 176. A circular disk blade 178, preferably double-beveled for durability, is coupled to the shaft of the gear reducer 174 through a coupling 180. The gear reducer gears down the speed from 1725 rpm at the motor to less than 3 rpm at the blade 178. Alternatively, a variable frequency drive could be used to adjust the speed of the blade.

Both the inner 168 and outer mounting brackets 170 have vertical portions attached to the support blocks 164, 165 and oblique portions slanted toward the runway 48. The oblique portions are slanted so that the blades 178 lie in a plane parallel to the length of the runway and form an acute angle $\theta$ with a vertical plane P bisecting the runway 48. Each cutter 162 flanks the runway 48 as a mirror image of the other with the blades almost touching at their lowermost point T. Viewed from along the runway 48, as in FIG. 7, the blades 178 are disposed to cut a V-shaped path in an object advanced along the runway. The angle $\alpha$ of the vertex of the V is twice the acute angle θ between each blade 178 and the vertical plane P, i.e., α=2θ.

Figure 10:
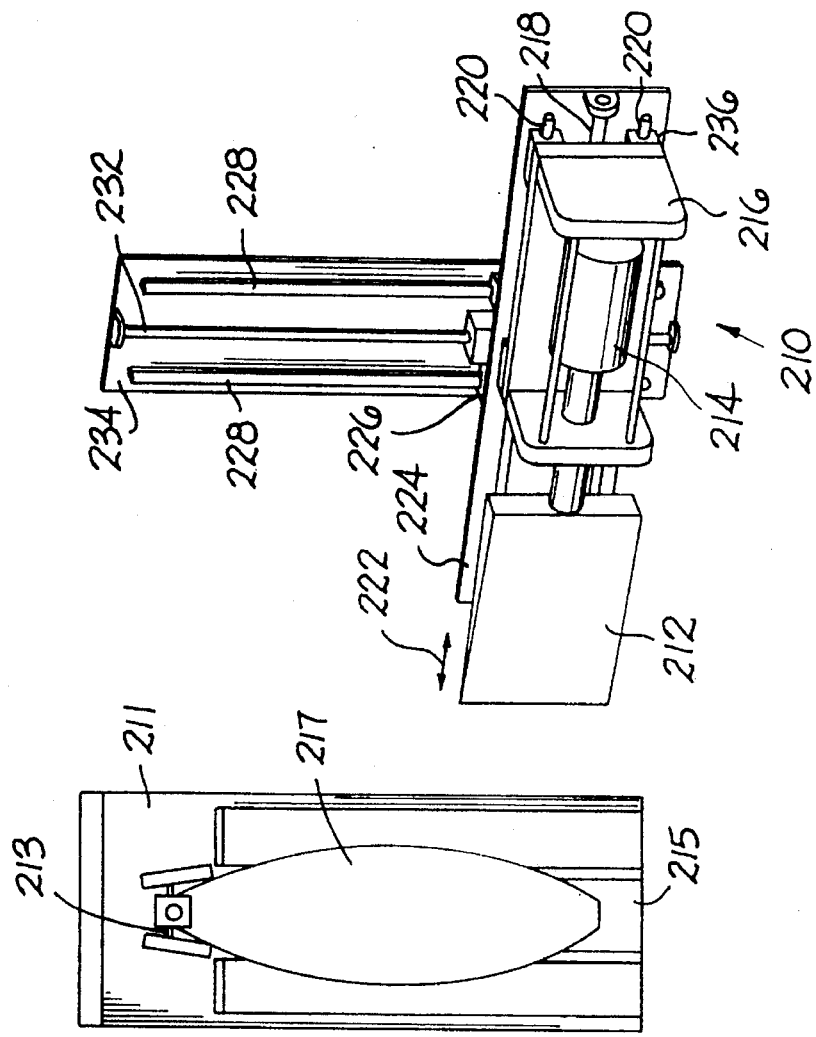
FIG. 10 is an overhead perspective view of an alternative version of the cutting assembly for use in the apparatus of FIG. 2.
Figure 10:
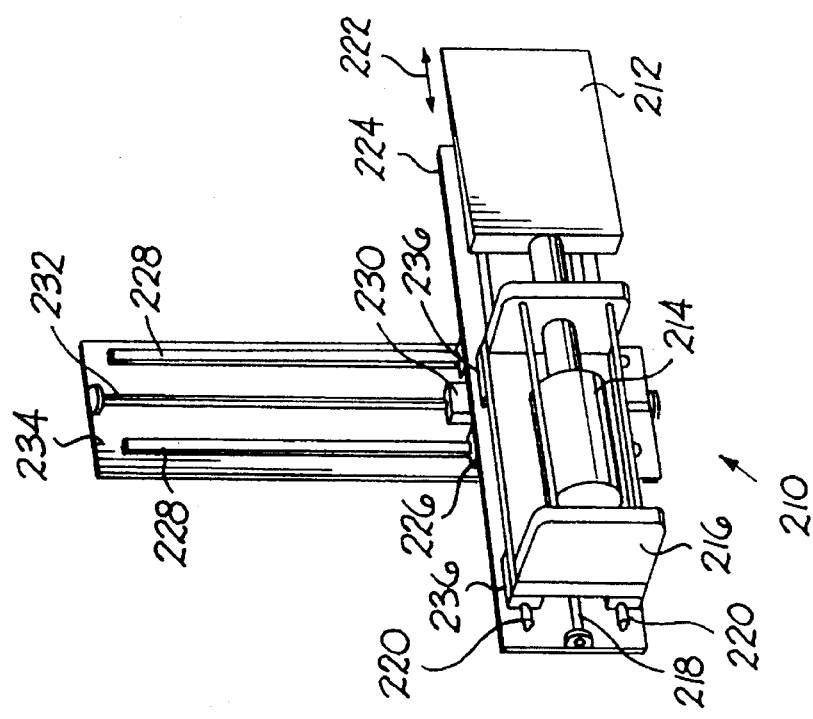

An alternative version of the cutting assembly is shown in FIG. 10 in which a pair of ultrasonic cutters 210 are positioned on opposite sides of a fish support 211 having a head stop 213 and a support plate 215 for registering a fish 217 as in the carrier 50 version in FIGS. 4 and 5. Each cutter 210 comprises a straight blade 212 driven by an ultrasonic transducer 214 mounted on a carriage 216. The carriage is driven by a first air cylinder 218 along a first pair of rails 220. A runner (not shown) attached to the underside of the carriage 216 is dragged along by the air cylinder 218 to translate the carriage along the first pair of rails 220. Bushings 236 at the underside corners of the carriage 216 slidably support the carriage on the rails 220. The ultrasonic transducer 214 reciprocates the blade 212 at about 20 kHz in the direction of its translation along the rails 220 and into the fish, as indicated by arrow 222. The rails 220 and air cylinder 218 that slide the carriage 216 are further mounted on a plate 224. Mounted to the underside of the plate 224 are bushing assemblies 226 and a runner 230, which is driven by a second air cylinder 232. The bushing assemblies 226 provide bearing surfaces that engage a second pair of rails 228 arranged perpendicular to the first set of rails 220 and generally parallel to the preferred cutting path 190. Thus, in this version of the apparatus, the ultrasonic cutters 210 advance while the fish is maintained stationary in the support 211. The second pair of rails 228 and the second air cylinder 232 are, in turn, mounted on a second plate 234, which is attached to the framework of the apparatus. Of course, the second plate 234, the second pair of rails 228, and the second air cylinder 232, as well as the associated runner 230 and bushings 226, can be eliminated and the cutters 210 affixed to the framework in the manner of the cutting assembly of FIGS. 6 and 7 with the fish advanced into the stationary cutting assembly.

Figure 8A:
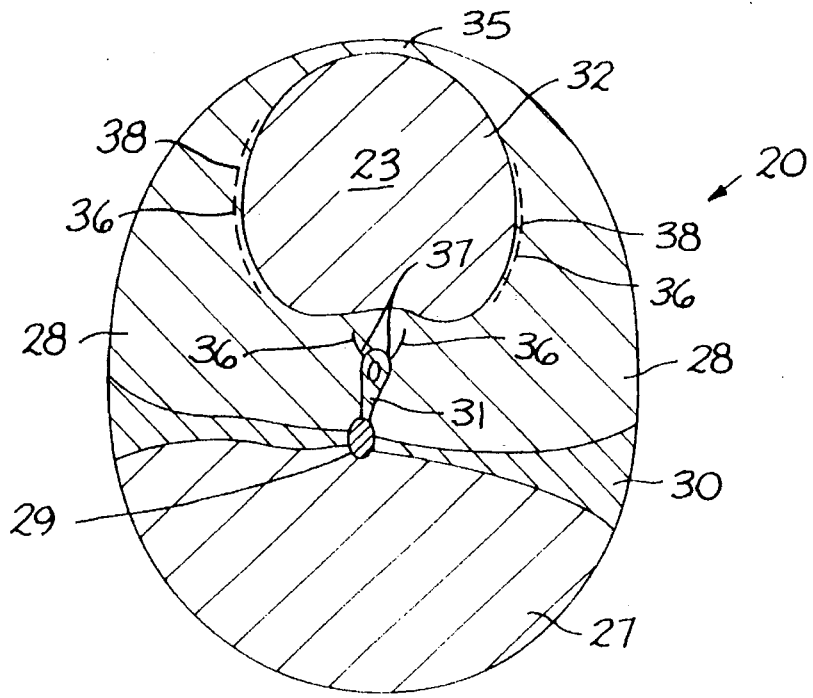
FIG. 8A is an unexploded cross-sectional view of a fish body, such as that in FIG. 1, prior to cutting.

The anatomical layout of a fish body 20 is shown belly up in cross-section in FIG. 8A. The fish body 20 contains upper loins 27 on the dorsal side of the fish separated from lower loins 28 by the backbone 29 and a red meat region 30 generally extending across the fish and encompassing the backbone. The lower loins 28 are separated from each other by the hemal spine 31, which extends downward of the backbone 29, and the visceral cavity 32, which contains the viscera 23 and runs from the head 24 to the vent 34 of the fish body 20. A thin layer of meat extending along the ventral side of the visceral cavity 32 is the belly wall meat 35, which, along with the upper 27 and lower loins 28, compose the edible portions of the fish. Running through a portion of the lower loins 28 from near the hemal spine 31 and along each side of the visceral cavity 32 is a series of belly bones 36. The bones 36 extend generally circumferentially at their proximal ends 37 near the hemal spine 31, but trail off along the length of the fish body 20 at their distal portions 38. It is critical that the belly bones 36 be separated from the loin meat before canning.

Figure 8B:
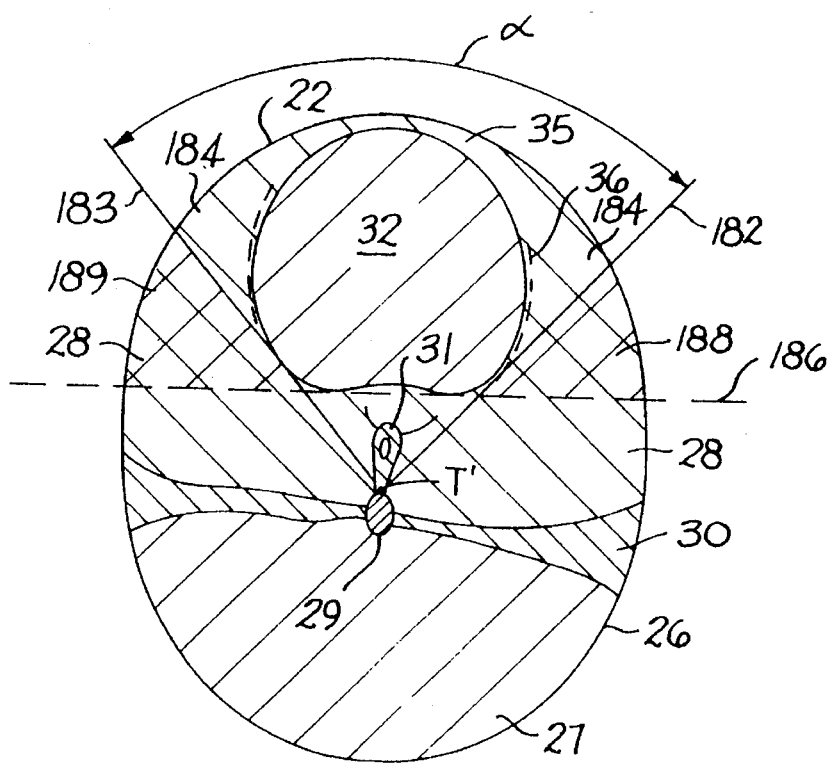
FIG. 8B is an unexploded cross-sectional view of the fish body of FIG. 8A, showing a pair of cut lines as cut by the apparatus of FIG. 2.

One possible cut for the fish anatomy described in FIG. 8A is shown in FIG. 8B. Two cut lines 182, 183 separated by an angle α meet at a point T' near the juncture of the hemal spine 31 and the backbone 29. The V-shaped cut formed along the cut lines 182, 183 separates a viscera-containing belly section 22 from a loin-containing dorsal section 26. The belly section also includes waste portions, such as the bloody hemal spine 31 and the belly bones 36. The thin belly wall meat 35, along with lower portions 184 of the lower loins 28, are separated from the loin-containing section 26. The loin-containing section 26, which includes the upper 27 and lower loins 28, is sent to a processing station where, as an example, the loins could be separated from the backbone and blood meat. The belly section 24 is sent to a different processing station in which, as another example, the viscera 33, belly bones 36, and the inedible portions could be removed from the belly wall meat 35 and the lower loin extremity meat 184. The functions performed at the processing stations need not be limited to the specific examples mentioned.

FIG. 8B also illustrates the advantages of the V-cut over the linear cut along cut line 186. The cut line 186 depicts a cut that maximizes, under the constraint of a single, linear cut, the amount of loin meat retained by the loin-containing portion, while extracting all of the visceral cavity 32. Subdividing a fish along such a cut line has one or more of the following deficiencies: a) the belly bones 36 are severed, with portions remaining in the loin section; b) the bloody hemal spine 31 remains with the loin section; c) two sizable chunks 188, 189 of lower loin meat that would be spared by the V-cut are severed from the loin portion by the linear cut; and d) the severed meat portion surrounding the visceral cavity varies greatly in thickness and is not amenable to uniform cooking. Thus, the V-cut eliminates additional processing steps that are necessary with the linear cut. The cutting assembly 46 is adjusted so that the angle α between the blades 178 produces the cut lines 182, 183 of FIG. 8B. Testing has indicated that for various species of tuna, different angles α are better than others, but a preferred range from 80° to 160°, with a preferred nominal setting of about 120°, works well.

Figure 9:
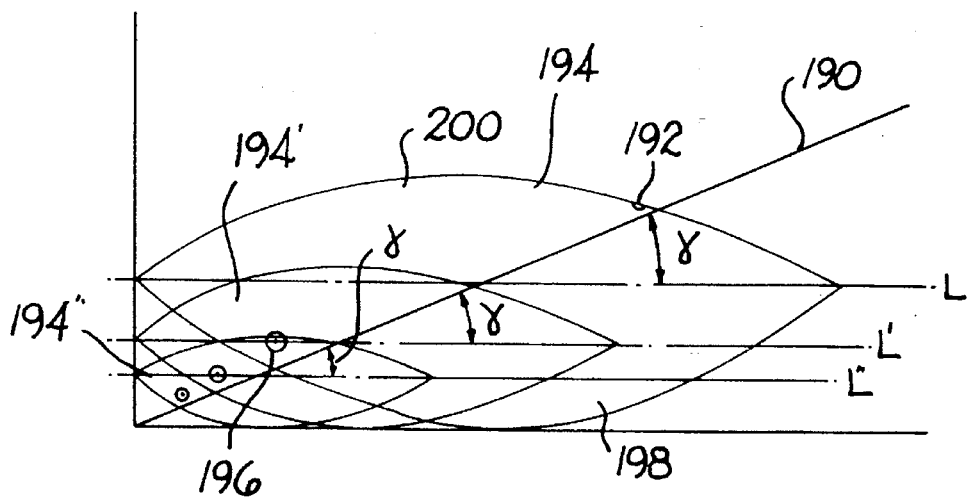
FIG. 9 is a side view representation of fish bodies of different sizes illustrating the preferred angle of the cut line provided by the apparatus of FIG. 2 regardless of fish size.
Figure 2:
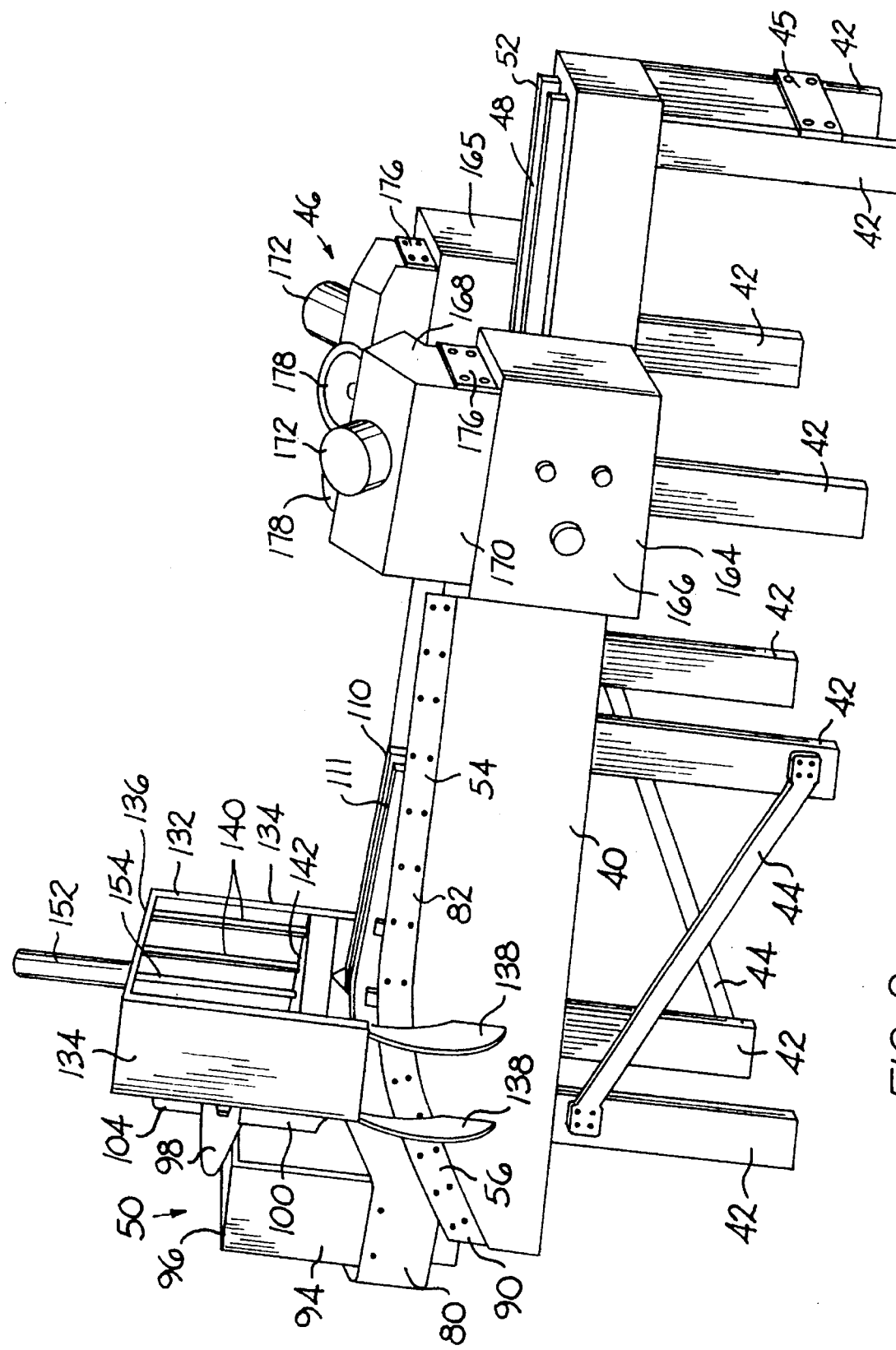
FIG. 2 is a perspective view of a version of the cutting apparatus of the invention.
Figure 3:
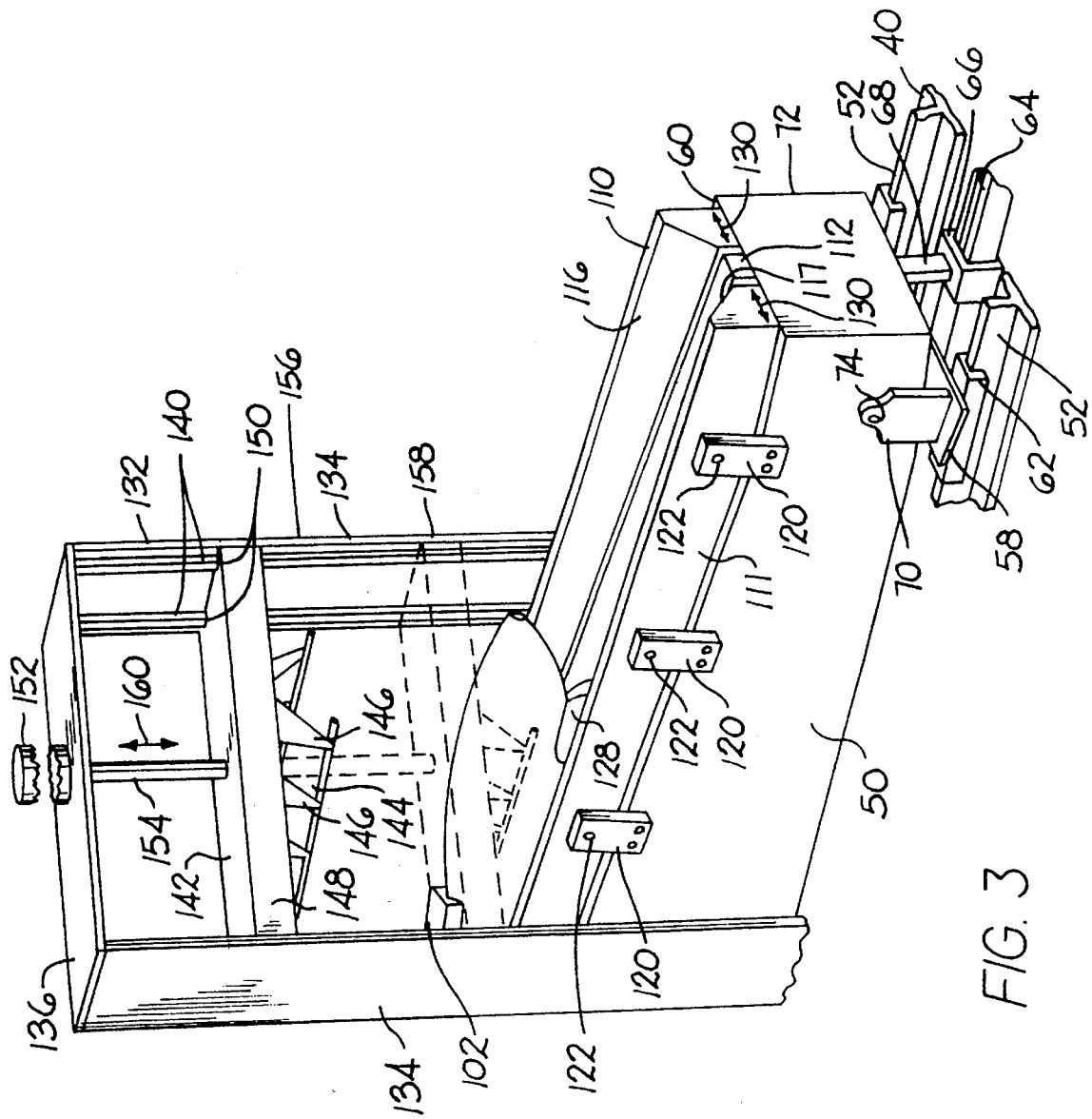
FIG. 3 is a partial perspective view of the fish carrier assembly and the leveler gantry portions of the apparatus of FIG. 2.

As illustrated in FIG. 9, a cut 190 extending from about the vent 192 to the eyes 196 is effective in separating the fish 194 into a loin-containing section 198 and a viscera-containing portion 200. Whether the fish is a large fish 194, a medium fish 194', or a small fish 194", its proportionality is such that the preferred cut 190 forms about the same angle γ with the longitudinal axis L, L', L" of the fish, regardless of size. Although the angle γ differs from species to species, a nominal preferred range for use with the invention is from 10° to 17° with the cut preferably exiting the head on the dorsal side at the eyes 196. With the vertical and horizontal axes representing the orthogonal relationship of the fish-supporting surfaces of the head stop 101 and the stop plate 112 of FIG. 5, the capability of the carrier 50, using the head stop and the stop plate as bases, to automatically accommodate fish of various sizes is illustrated by the three fish figures in FIG. 9.

The first step in subdividing a fish 84 with the apparatus is loading the fish into the carrier 50. The carrier 50 is retracted along the runway 48 away from the cutting assembly 46. So stationed, the carrier wheels 78 rest in the lower end 90 of the track 82 so that the support portion 60 of the carrier is generally horizontal beneath the gantry 132. A fish 84 is loaded longitudinally onto the carrier 50 with its belly up and its tail toward the cutting assembly 46. The back ridge of the fish 84 is supported by the stop plate 112 and the sides of the fish laterally supported by the adjustable rails 110, 111. The head of the fish 84 is loaded into the head retainer assembly 92, the head wedges 100 supporting the head between them. With the fish 84 loaded loosely, the leveler 144 is lowered to contact the ventral side of the fish. The leveler 144 urges the fish 84 into the preferred orientation, i.e., with its longitudinal axis generally along the runway 48. With the leveler 144 still in place on the belly of the fish 84, the head clamp 102 is lowered in place to secure the head of the fish and the tail wedges 128 engage to secure the rear of the fish. The leveler 144 is then raised out of the way.

With the fish properly positioned on the carrier 50, the air cylinder 64 is activated to advance the carrier along the runway 48. As the carrier 50 proceeds, its wheels 78 ride up the sloped portion of the track 82, thereby causing the support portion 60 to tilt forward relative to the base portion 58 and the runway 48. As the wheels 78 advance along the horizontal portion of the track 82, the fish 84 is tilted with its longitudinal axis at the preselected angle γ relative to the runway 48. In this way, the fish body 84 is advanced through the cutting assembly 46 with the blades 178 disposed to cut along a pair of paths that intersect along a line extending approximately from the vent to the outside of the fish 84 near the eyes. Because the fish 84 is belly-up in the carrier 50, the V-shaped cut opens upward toward the belly. The blades 178 are angled relative to each other at a preselected angle α to optimize the separation of viscera and belly meat from the loin portion.

To decrease the amount of power required to advance a fish 84 through the cutting assembly 46, the blades 178 are rotated at a relatively low speed in the direction of the arrow 202 in FIG. 6. The speed of the circumference of the circular blades 178 is set by the gear reducers 174 to approximate the speed of the advancing carder 50. Thus, the blades 178 tend to pull the fish 84 along as they cut, thereby aiding the advancement of the fish. Once the carrier 50 is advanced to the point at which the head clamp 102 is almost to the blades 178, the clamp is retracted upward and the tail wedges 128 released. The blades 178 are able to pull the fish 84 free of the head wedges 100 and advance it through the cutting assembly 46 in the direction of arrow 204 to complete the cut. The subdivided fish body 206 can then be conveyed away by, for example, a carriage (not shown) that rides along the guide rails 52 exiting the cutting assembly 46.

With the cutting assembly version of FIG. 10, the operation is slightly different. Instead of the carrier's 50 being advanced continuously along the runway 48, the ultrasonic cutters 210 are advanced on the second set of rails 228 along the length of the fish. The cutters 210 are stopped at consecutive positions along the rails 228 roughly spaced by the length of the blades for contiguous cuts to be made.

Thus, the invention provides apparatus and methods for subdividing a fish body in two sections—a viscera-containing section and a loin-containing section—in preparation for further individual processing steps, while at least fulfilling the needs and providing the specific features and advantages pointed out.

Although the invention has been described in considerable detail with reference to certain preferred versions, other versions are possible. For example, the support portion of the platform could be actively tilted by motors or air cylinder or solenoids. Furthermore, the generally horizontal layout of the apparatus should not be considered as the only possible orientation to achieve the described cut line along the vertex of the cut from the vent to the eye region. In fact, the fish could be supported with its belly downward to prevent blood and other unsavory fluids from dripping into the loin section. Therefore, as suggested just by these examples, the spirit and scope of the appended claims should not be limited to the description of the preferred versions contained herein.

What is claimed is:

1. A method of subdividing a fish into two sections, comprising cutting the fish with a pair of cuts flanking and forming acute angles with a central vertical plane through the fish, the acute angles being selected to position the cuts to avoid the visceral cavity and the belly bones beside the visceral cavity, the cuts meeting along a path disposed largely between the backbone of the fish and the visceral cavity and extending substantially from the vent to a point on the outside surface of the fish proximate the eyes and opening toward the ventral side of the fish to cut a wedge-shaped belly-bone- and viscera-containing belly section from the fish.

2. The method of claim 1 wherein each of the pair of cuts is planar to form a V-shaped cut.

3. The method of claim 2 wherein the sum of the acute angles formed with the vertical plane between the cuts is between about 80° and 160°.

4. The method of claim 1 wherein the path is a straight line.

5. The method of claim 1 wherein the path forms an angle of between about 10° and 17° with the longitudinal axis of the fish.

6. The method of claim 1 wherein the path extends substantially from the vent to a point on the outside surface of the fish on the dorsal side of the eyes.

7. A method of subdividing a fish into two sections, comprising cutting the fish with a pair of angling cuts intersecting to form a V that opens toward the ventral side of the fish, the cuts passing through the outside surface of the fish on opposite sides of a central vertical plane through the fish and avoiding the visceral cavity and the belly bones beside the visceral cavity and meeting at the vertex of the V along a path disposed largely between the backbone of the fish and the visceral cavity and extending substantially from the vent to a point on the outside surface of the fish proximate the eyes to cut a wedge-shaped belly-bone- and viscera-containing belly section from the fish.

8. The method of claim 7 wherein the cuts meet at the vertex of the V at an angle of between about 80° and 160°.

9. The method of claim 7 wherein the cuts are made by a rotating circular blade.

10. The method of claim 7 wherein the cuts are made by an ultrasonically reciprocated blade.

11. A method of subdividing a fish body into two sections, comprising the steps of:

positioning along a transport path a cutting assembly arranged to cut along two planes intersecting at a preselected angle and forming an intersection path along the transport path;

aligning a belly-up fish body longitudinally along the transport path so that a path extending substantially from the vent to the outside of the fish body proximate the eyes and disposed largely between the visceral cavity and the backbone is aligned with the intersection path;

advancing the aligned belly-up fish body along the transport path through the cutting assembly; and cutting the belly-up fish body along the two intersecting planes upwardly from their intersection at the preselected angle selected to avoid cutting into the visceral cavity and the belly bones beside the visceral cavity to separate a wedge-shaped, belly- bone- and viscera-containing belly section from the remainder of the fish body.

12. Apparatus for subdividing a fish body, comprising:

a cutting assembly having cutting means for producing a pair of joined, facing cuts into an object advanced along a cutting direction through the cutting assembly;

a carder supporting a fish;

a runway arranged in the cutting direction and disposed between the cutting assembly and the carrier, the carrier supporting the fish lengthwise along the runway;

means for advancing the carrier and the cutting assembly relative to each other along the runway in the cutting direction; and means for setting the angle between the cutting direction and the longitudinal axis of the fish on the carrier as the fish advances relative to the cutting assembly so that the facing cuts join along a path disposed largely between the backbone of the fish and the visceral cavity and extending substantially from the vent to a point on the outside of the fish proximate the eyes to avoid the visceral cavity and the belly bones beside the visceral cavity while cutting a wedge-shaped belly-bone- and viscera-containing belly section from the fish.

13. The apparatus of claim 12 wherein the carrier comprises a base portion and a support portion pivotalle attached to the base portion, the support portion adapted to pivotally tilt to adjust the longitudinally axis of the fish.

14. The apparatus of claim 12 wherein the carrier comprises a longitudinal stop plate supporting the back of the fish and a pair of flanking laterally-slidable rails having opposing surfaces angled outwardly of the stop plate to form a truncated V-shaped channel, the laterally-slidable rails adapting the width of the channel to accommodate fish of varying sizes and laterally supporting the fish supported on the stop plate.

15. The apparatus of claim 14 further comprising tail wedges slidably contacting the opposed surfaces of the rails and engageable with the fish proximate the tail end to secure it from sliding against the rail.

16. The apparatus of claim 12 wherein the means for setting the angle between the cutting direction and the longitudinal axis of the fish sets a constant angle of between about 10° and 17°.

17. The apparatus of claim 12 wherein the carrier further comprises a head retainer for securing the head of the fish at an end of the carrier farther from the cutting assembly.

18. The apparatus of claim 12 further comprising means for automatically aligning the fish in the carrier with its longitudinal axis substantially along the runway.

19. The apparatus of claim 12 wherein the cutting assembly is stationary at an end of the runway and the means for advancing the carrier and the cutting assembly relative to each other urges the carrier along the runway.

20. The apparatus of claim 12 wherein the carrier is stationary and the means for advancing moves the cutting assembly along the runway.

21. The apparatus of claim 12 wherein the carrier comprises a base portion and a support portion pivotally attached to the base portion and wherein the means for setting the angle between the cutting direction and the longitudinal axis of the fish pivotally adjusts the tilt of the support portion from a generally horizontal orientation for loading the fish into the carrier to a tilted orientation while the means for advancing the carder advances the fish through the cutting assembly.

22. The apparatus of claim 12 wherein the cutting means produces a V-shaped cut.

23. The apparatus of claim 12 wherein the cutting means comprises a pair of blades arranged to flank the runway symmetrically.

24. The apparatus of claim 12 wherein the cutting means comprises a first rotating circular blade angling upwardly and outwardly above the runway from the vertical plane bisecting the length of the runway and a second rotating circular blade arranged on the opposite side of the runway substantially tangent to the first circular blade to mirror the first circular blade about the vertical plane.

25. The apparatus of claim 24 wherein the cutting assembly further comprises means for rotating the circular blades at a predetermined rate such that the speed of the circumference of the blade is substantially equal to the speed of advancement of the carrier along the runway.

26. The apparatus of claim 12 wherein the cutting means comprises a straight blade and wherein the means for advancing advances the carrier and the cutting assembly relative to each other along the runway between cuts and halts the relative advancement during cutting.

27. The apparatus of claim 12 wherein the cutting means comprises an ultrasonic transducer coupled to a blade for reciprocating the blade as it cuts.

28. A cutting assembly for cutting a belly-bone- and viscera-containing belly section from a fish transported relative to the cutting assembly along a transport path, comprising:

a first blade positioned on a first side of the transport path and disposed to make a first cut in the ventral side of a fish being transported along the transport path, the first cut running from a first side of the fish to a central line extending substantially from the vent to a point on the outside of the fish proximate the eyes, the first cut further being positioned proximate the belly bones on the first side of the fish with the belly bones on the first side disposed between the visceral cavity and the first cut;

a second blade positioned on a second side of the transport path and disposed to make a second cut in the ventral side of the fish, the second cut running from a second side of the fish to the central line, the second cut further being positioned proximate the belly bones on the second side of the fish with the belly bones on the second side disposed between the visceral cavity and the second cut, the cutting assembly thereby cutting a belly-bone- and viscera-containing belly section from the fish being transported along the transport path.

29. The cutting assembly of claim 28 wherein the first cut is cut along a first plane and the second cut is cut along a second plane, the first plane and the second plane intersecting at the central line such that an angle of less than 180° is formed between the first cut and the second cut.

30. The cutting assembly of claim 29 wherein the angle formed between the first cut and the second cut is between about 80° and 160°.

31. The cutting assembly of claim 28 wherein the first blade and the second blade are positioned as mirror images of each other on opposite sides of the transport path.

32. The cutting assembly of claim 28 wherein the first blade and the second blade are circular blades and wherein the cutting assembly further comprises means for rotating the circular blades.

33. The cutting assembly of claim 28 further comprising means for translating the first blade and the second blade radially into the fish to the center line.

* * * * *